United States Patent [19]

Jones

[11] Patent Number: 5,304,435
[45] Date of Patent: Apr. 19, 1994

[54] PRESSURE VESSEL CONSTRUCTION FOR A METAL OXIDE-HYDROGEN BATTERY

[75] Inventor: Kenneth R. Jones, Oconomowoc, Wis.

[73] Assignee: Globe-Union Inc., Milwaukee, Wis.

[21] Appl. No.: 927,072

[22] Filed: Aug. 7, 1992

[51] Int. Cl.⁵ .................... H01M 10/34; H01M 10/50
[52] U.S. Cl. .................................... 429/101; 429/120; 429/176
[58] Field of Search ...................... 429/101, 120, 176

[56] References Cited

U.S. PATENT DOCUMENTS

| | | | |
|---|---|---|---|
| 4,324,845 | 4/1982 | Stockel | 429/120 X |
| 4,923,769 | 5/1990 | Jones et al. | 429/101 |
| 4,957,830 | 9/1990 | Jones | 429/101 |
| 5,071,652 | 12/1991 | Jones et al. | 429/101 |
| 5,090,612 | 1/1992 | Jones | 228/184 |

Primary Examiner—Stephen Kalafut
Attorney, Agent, or Firm—Andrus, Sceales, Starke & Sawall

[57] ABSTRACT

An improved pressure vessel for a rechargeable metal oxide-hydrogen battery. The pressure vessel, which contains a plurality of cell modules, is composed of an inner liner of a material which is impervious to the passage of hydrogen gas and an outer layer of fiber reinforced thermosetting resin. The fibrous reinforcement is preferably in the form of substantially continuous, helically wound filaments. Dispersed within the resin matrix of the outer layer are a plurality of finely divided particles of a material having a high coefficient of thermal conductivity. The finely divided material can be in the form of powder or fibers, and can be composed of a metal or graphite. By incorporating the finely divided heat conductive particles in the resin, the heat dissipation through the pressure vessel is increased to thereby improve the performance of the battery.

13 Claims, 1 Drawing Sheet

PRESSURE VESSEL CONSTRUCTION FOR A METAL OXIDE-HYDROGEN BATTERY

BACKGROUND OF THE INVENTION

Metal oxide-hydrogen batteries, such as nickel oxide-hydrogen batteries, have seen wide use in aerospace applications because they are rechargeable, have an extremely long cycle life and provide a uniform output during the entire discharge cycle.

In the typical nickel oxide-hydrogen battery the positive electrodes are generally in the form of flat porous, sintered nickel plaques impregnated with nickel hydroxide, while the negative electrodes are formed of a fine nickel mesh screen having a catalyst, such as platinum black, bonded to one surface of the screen through a hydrophobic polymeric material. On discharge of the battery, hydrogen gas diffuses through the electrolyte surrounding the catalyst surfaces of the negative plates and becomes disassociated by the catalyst to the monatomic form. The monatomic hydrogen is ionized and combined with hydroxyl ions to form water with an electron being released in the process of forming each hydrogen ion. In addition, hydroxyl ions are formed at the positive electrode by the reaction of water with the available oxygen content of the nickel oxide. As a result of these reactions an electron current is produced in the exterior circuit.

On recharging the reaction is reversed, with the recharging being characterized by the regeneration of hydrogen gas at the negative electrode and the reoxidation of the nickel hydroxide at the positive electrode.

To reduce the volume of hydrogen gas required for reaction, the hydrogen is compressed within an outer pressure vessel that contains the electrodes. In the past, the outer vessel has been composed of a high strength corrosion resistant alloy, such an Inconel. However, the fabrication of a pressure vessel from an alloy such as Inconel is extremely expensive. Further, different applications of use of the metal oxide-hydrogen battery have different pressure requirements and thus there is no standardized wall thickness for the Inconel vessel.

Because of these problems, it has been proposed to construct the pressure vessel of a thin-walled liner formed of a material which is impervious to the passage of hydrogen gas and then to wrap the liner with hoop or cylindrical and helical windings of fibrous material impregnated with a thermosetting resin to provide the necessary strength for the particular application of use. In a vessel of this type, the inner liner can either be formed of a thin layer of a metal, such as Inconel or stainless steel, or it can be a polymeric film, as described in U.S. Pat. No. 4,923,769. The use of an outer fiber reinforced resin layer has the advantage that the strength for any particular application of use can be readily varied by increasing or decreasing the amount of windings in the outer layer, and by the use of different winding patterns.

To improve the performance of the battery, heat transfer fins have been incorporated with the cell modules to increase the transfer of heat from the cell modules to the vessel wall and hence to the exterior. However, a fiber reinforced resin outer layer restricts the transfer of heat to the exterior. It is recognized that the heat transfer of the outer layer is adequate in the X and Y directions, which are parallel to the fiber orientation, because the fibers, which can be graphite or glass, act as heat conductive cores. However, the heat transfer in the Z direction, which is in the direction of the wall thickness, is relatively poor. Attempts have been made to increase the heat transfer in the Z direction by abrading the fibrous material to provide minute fibrils on the fibers, or by varying the winding pattern. However, these attempts have not appreciably increased the heat transfer through the outer fiber reinforced resin layer of the vessel.

SUMMARY OF THE INVENTION

The invention is directed to an improved metal oxide-hydrogen battery, in which the outer pressure vessel has improved heat transfer properties to thereby increase the heat dissipation from the cell modules to the exterior.

The outer pressure vessel contains a plurality of cell modules, each having at least one positive electrode and at least one negative electrode impregnated with a liquid electrolyte. The vessel is composed of an inner liner of a material which is impervious to the passage of hydrogen gas and can take the form of either a corrosion resistant metal, such as Inconel or stainless steel, or a polymeric film, such as polyvinylidene chloride.

The pressure vessel also includes an outer layer, composed of a fibrous material bonded by a thermosetting resin. The fibrous material is preferably in the form of a series of superimposed layers of helical and cylindrical windings and the fibers can take the form of a material such as glass or graphite. The thermosetting resin binder is preferably an epoxy resin.

In accordance with the invention, a multiplicity of finely divided particles of a material having a high coefficient of thermal conductivity are dispersed throughout the resin matrix of the outer layer. The finely divided particles can be in the form of powder or fibers and generally have an average particle size less than 5 microns. Mix ratios can be as high as 80% particles to resin by weight.

In general, the particles have a coefficient of thermal conductivity greater than 100 watts/meter° K. and can take the form of metal particles, such as aluminum, silver, copper, or the like, or graphite particles.

The heat conductive particles form bridges between the fibrous reinforcement and thereby increase the heat conductivity in the Z direction. By increasing the heat conductivity, the heat will be more readily dissipated from the battery, which will improve the performance and increase the service life.

If the heat conductive particles are in the form of small fibers they can also add to the strength to the outer layer of the pressure vessel.

When the battery is used in space or satellite applications, the addition of the heat conductive particles in the outer layer enhances the radiation shield for the battery.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
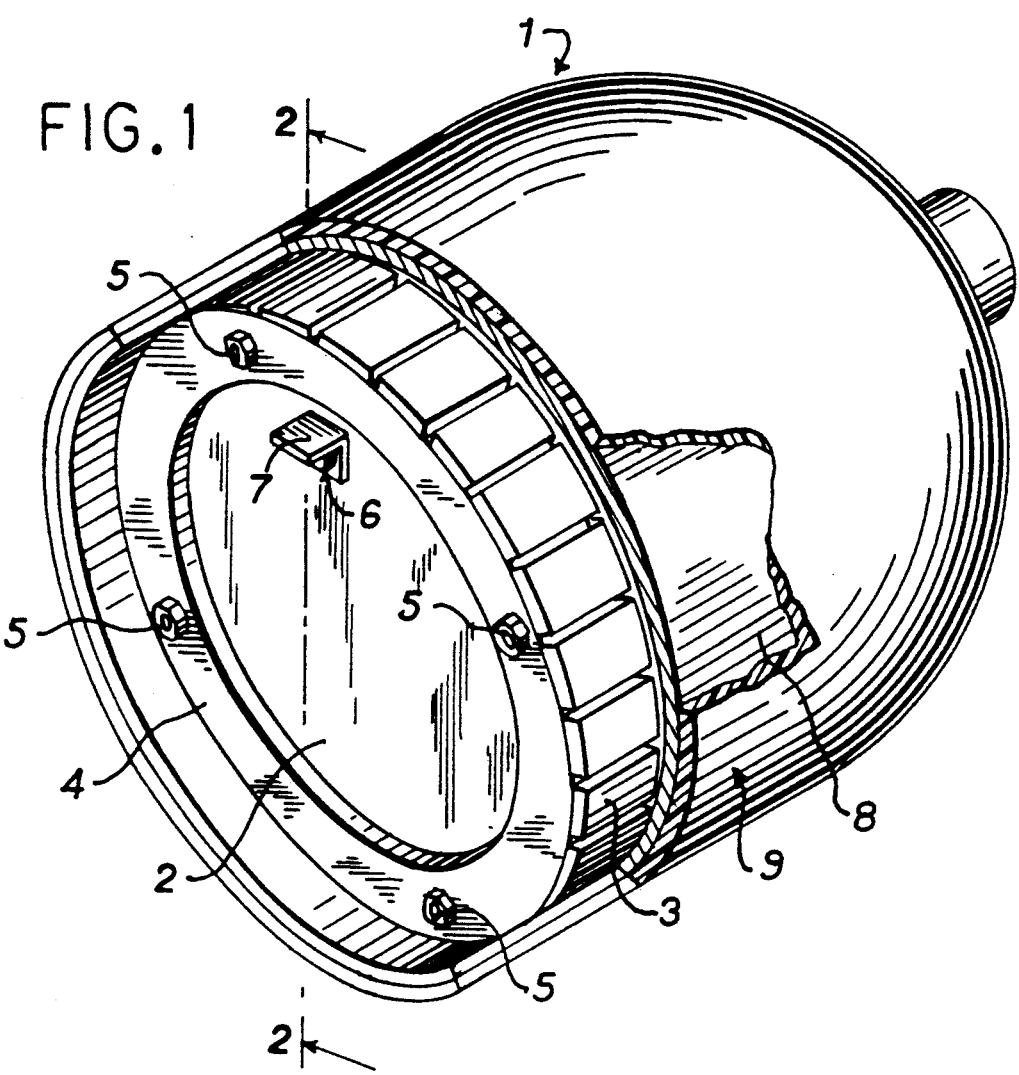
FIG. 1 is a perspective view of a typical metal oxide-hydrogen battery incorporating the invention and with parts broken away in section.

FIG. 1 illustrates a rechargeable metal oxide-hydrogen battery, such as a nickel oxide-hydrogen battery. The battery is composed of an outer pressure vessel 1 that houses one or more cell modules 2. The vessel 1 is formed of a generally cylindrical central section, the ends of which are enclosed by dome-shaped heads. The cell modules can be constructed as disclosed in U.S. Pat. No. 5,173,376, filed Oct. 28, 1991. In general, each cell module is composed of a pair of back-to-back positive electrodes spaced apart by a separator layer, along with a pair of negative electrodes, each disposed and separate from a positive electrode. The positive electrodes are in the form of flat, porous, sintered nickel plaques impregnated with nickel hydroxide, while the negative electrodes are in the form of fine mesh nickel screen having a catalyst, such as platinum black, bonded to one surface of the screen through a hydrophobic polymeric material. A liquid electrolyte, such as potassium hydroxide solution, is impregnated into fibrous separator layers that separate the electrodes.

The cell modules can be connected together either in series or parallel relation to obtain the desired voltage output.

To aid in transfer of heat from the cell modules to the pressure vessel, heat fins 3 can be incorporated between adjacent cell modules 2. The heat fins can be constructed as shown in U.S. Pat. No. 5,071,652, and each heat fin includes a generally flat body or fin, which is disposed between adjacent cell modules and a peripheral flange which is positioned in contact with the inner surface of the pressure vessel.

To mount the cell modules 2 within pressure vessel 1, a pair of annular weld rings 4 are welded to the inner surface of vessel 1 and are spaced longitudinally from each other. A plurality of tie rods extend through aligned openings in the rings 4, as well as through holes in the cell modules 2 and fins 3 and loosely connect the cell modules to the rings. A conductor assembly 6, such as disclosed in U.S. patent application Ser. No. 07/783,066, filed Oct. 28, 1991, extends through central openings in the cell modules and serves to connect the positive and negative electrodes of the cell modules in the desired circuitry. Terminals 7 are connected to the opposite ends of the connector assembly, and electrical leads, not shown, are connected to the terminal and extend in sealed relation through the pressure vessel 1 to the exterior.

In accordance with the invention, vessel 1 is composed of an inner liner 8 which is impermeable to the flow of hydrogen gas. The liner may take the form of a corrosion resistant metal, such as Inconel or stainless steel, or alternately, the liner can be composed of a polymeric film, such as polyvinylidene chloride. While liner 8 is impervious to the passage of hydrogen gas, it in itself does not have sufficient strength to withstand the high internal pressures generated in the vessel during operation of the battery, which can be as high as several thousand psi.

To provide the necessary strength for vessel 1 to withstand the internal pressure, the vessel includes an outer layer 9 which can take the form of fibrous material 10 impregnated with a thermosetting resin 11. The fibrous material 10 can be glass or graphite fibers, or a combination thereof, which are preferably wound in a number of superimposed layers to provide the desired strength for the vessel. The winding pattern can be that conventionally used in the fabrication of filament wound vessels and can include a combination of helical, as well as substantially longitudinal windings.

The thermosetting resin 11 can be a type as conventionally used in filament winding processes, such as a polyester or epoxy resin. The epoxy resin is preferred.

Dispersed within the resin matrix 11 of outer layer 9 are a multiplicity of finely divided particles 12 of a material having a coefficient of thermal conductivity greater than 100 watts/meter° K. The particles 12 can either be in the form of fine powder or fibers and, in general, have an average size less than about 5 microns. The particles 12 comprise from 10% to 80% by weight of the resin matrix 11.

The heat conductive particles 12 can take the form of a metal, such as aluminum, copper, silver, or the like, or the particles can also be composed of graphite.

Figure 2:
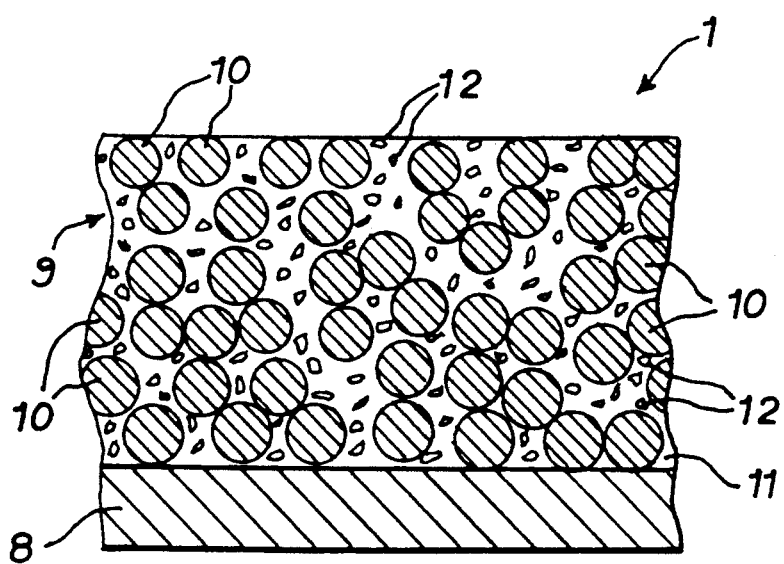
FIG. 2 is an enlarged fragmentary cross sectional view of the wall of the pressure vessel.

The particles 12 in the outer layer 9 serve to bridge the fibrous windings 10, as illustrated in FIG. 2, and thereby increase the heat conductivity through the outer layer. By increasing the heat dissipation, any tendency to overheat the battery is minimized thereby improving the performance of the battery and substantially increasing the service life.

The pressure requirements for a metal oxide hydrogen battery can vary substantially depending upon its application of use. For example, when used in satellite applications, the battery may be designed for a maximum pressure of about 2,500 psi. When the battery is used in aircraft starter applications, the battery may be designed for a maximum pressure of 5,000 psi. Conversely, in other applications, the battery may have a 100 psi maximum capacity, in which case the fiber reinforcement 10 in the outer layer 9 can be eliminated and the outer layer may take the form of the resin matrix containing the interspersed heat conductive particles 12.

Through the use of the invention, the heat dissipation from the cell modules 2 through the vessel wall is substantially increased thereby reducing the possibility of overheating and providing more effective performance for the battery.

As a further advantage, the incorporation of the heat conductive particles 12 in the outer layer enhances the radiation shield, which is an advantage if the battery is to be used in space or satellite applications.

If the particles 12 are in the form of fibers, the fiber can contribute to an increase in strength in the outer layer.

Various modes of carrying out the invention are contemplated as being within the scope of the following claims particularly pointing out and distinctly claiming the subject matter which is regarded as the invention.

I claim:

1. In a metal oxide-hydrogen battery, an outer sealed pressure vessel, a plurality of cell modules disposed within said vessel, each cell module including a positive electrode and a negative electrode, said pressure vessel including an inner liner impervious to the passage of hydrogen gas and including an outer layer disposed in contact with the outer surface of said inner liner, said outer layer being composed of substantially continuous filaments disposed in superimposed layers on said liner and bonded by a thermosetting resin, said outer layer also including a plurality of finely divided particles of a material having a high coefficient of thermal conductivity, said particles bridging said filaments and increasing the rate of heat transfer through said vessel to the exterior.

2. The battery of claim 1, wherein said material has an average particle size less than 5 microns.

3. The battery of claim 1, wherein said material is selected from the group of metal particles and graphite particles.

4. The battery of claim 2, wherein said material comprises fibers.

5. The battery of claim 1, wherein said thermosetting resin comprises an epoxy resin.

6. The battery of claim 1, wherein said filaments are selected from the group consisting of glass, graphite, and mixtures thereof.

7. The battery of claim 1, wherein said particles comprise from 10% to 80% by weight of said resin.

8. The battery of claim 1, and including heat transfer members disposed between adjacent cell modules, with each heat transfer member having a peripheral edge disposed in contact with said liner.

9. The battery of claim 1, wherein said liner is composed of metal.

10. The battery of claim 1, wherein said liner is composed of a polymeric film.

11. In a metal oxide-hydrogen battery, an outer pressure vessel having a wall, a plurality of cell modules contained within the vessel and disposed in bearing engagement with the vessel wall, each cell module including a positive electrode and a negative electrode, a heat transfer member disposed between adjacent cell modules with the outer peripheral edges of said heat transfer members being in contact with said vessel wall, said vessel wall including an inner liner impervious to the passage of hydrogen gas and an outer layer disposed in contact with the outer surface of said inner liner, said outer layer being composed of a plurality of superimposed layers of substantially continuous fibers bonded with a thermosetting resin, said outer layer also including a plurality of finely divided particles of a material having a coefficient of thermal conductivity greater than 100 watts/meter° K., said particles comprising from 10% to 80% by weight of said resin, and electrical conducting means connected to the electrodes of said cell modules and extending in sealed relation through said vessel wall to the exterior.

12. The battery of claim 11, wherein said inner liner is composed of a corrosion resistant metal and said fibers are selected from the group consisting of glass, graphite, and mixtures thereof.

13. The battery of claim 11, wherein said particles are selected from the group consisting of a metal, graphite, and mixtures thereof.

* * * * *